(12) United States Patent
Otsuka

(10) Patent No.: US 8,109,155 B2
(45) Date of Patent: Feb. 7, 2012

(54) METHODS AND APPARATUS TO MEASURE FLUID FLOW RATES

(75) Inventor: Akira Otsuka, Machida (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 544 days.

(21) Appl. No.: 12/390,498

(22) Filed: Feb. 23, 2009

(65) Prior Publication Data

US 2010/0212889 A1 Aug. 26, 2010

(51) Int. Cl.
*G01F 1/708* (2006.01)
*E21B 47/10* (2006.01)

(52) U.S. Cl. .................. 73/861.95; 73/152.33

(58) Field of Classification Search ............. 73/152.33, 73/861.95
See application file for complete search history.

(56) References Cited

U.S. PATENT DOCUMENTS

| | | | |
|---|---|---|---|
| 3,611,799 A | | 10/1971 | Davis |
| 4,004,576 A | * | 1/1977 | Gahwiler et al. ............. 600/526 |
| 4,458,709 A | * | 7/1984 | Springer .......................... 137/10 |
| 4,713,970 A | | 12/1987 | Lambert |
| 4,860,581 A | | 8/1989 | Zimmerman et al. |
| 4,936,139 A | | 6/1990 | Zimmerman et al. |
| 6,530,286 B1 | * | 3/2003 | Carver et al. ............... 73/861.95 |
| 7,270,015 B1 | * | 9/2007 | Feller .......................... 73/861.95 |
| 7,458,252 B2 | * | 12/2008 | Freemark et al. ............. 73/64.45 |
| 2006/0243033 A1 | * | 11/2006 | Freemark et al. ............. 73/64.45 |

FOREIGN PATENT DOCUMENTS

| | | |
|---|---|---|
| EP | 0597530 | 11/1993 |
| GB | 2390105 | 12/2003 |
| WO | 9415180 | 7/1994 |

OTHER PUBLICATIONS

Tagawa et al., "A Two-Thermocouple Probe Technique for Estimating Thermocouple Time Constants in Flow With Combustion: In Situ Parameter Identification of a First-Order Lag System," Review of Scientific Instruments, vol. 69, No. 9, Sep. 1998, pp. 3370-3378.

* cited by examiner

*Primary Examiner* — John Fitzgerald
(74) *Attorney, Agent, or Firm* — Daryl R. Wright; Jody DeStefanis; Jeff Griffin

(57) ABSTRACT

Example methods and apparatus to measure fluid flow rates are disclosed. A disclosed example apparatus includes a circulator to selectively circulate a fluid in a flowline, a generator thermally coupled to the flowline at a first location and controllable to form a heat wave in the fluid, a sensor thermally coupled to the flowline at a second location to measure a first value representative of the heat wave, a phase detector to determine a second value representative of a wavelength of the heat wave based on the first value, a frequency adjuster to control the generator to form the heat wave in the fluid at a first frequency, the first frequency selected so that the second value is substantially equal to a distance between the first and second locations, and a flow rate determiner to determine a flow rate of the fluid based on the first frequency.

18 Claims, 6 Drawing Sheets

METHODS AND APPARATUS TO MEASURE FLUID FLOW RATES

FIELD OF THE DISCLOSURE

This disclosure relates generally to fluids and, more particularly, to methods and apparatus to measure fluid flow rates.

BACKGROUND

Wellbores are drilled to, for example, locate and produce hydrocarbons. During a drilling operation, it may be desirable to perform evaluations of the formations penetrated and/or encountered formation fluids. In some cases, a drilling tool is removed and a wireline tool is then deployed into the wellbore to test and/or sample the formation and/or fluids associated with the formation. In other cases, the drilling tool may be provided with devices to test and/or sample the surrounding formation and/or formation fluids without the need to remove the drilling tool from the wellbore. These samples or tests may be used, for example, to characterize hydrocarbons.

Formation evaluation often requires fluid(s) from the formation to be drawn into the downhole tool for testing, evaluation and/or sampling. Various devices, such as probes, are extended from the downhole tool to establish fluid communication with the formation surrounding the wellbore and to draw fluid(s) into the downhole tool. Fluid(s) passing through and/or captured within the downhole tool may be tested and/or analyzed to determine various downhole parameters and/or properties while the downhole tool is positioned in situ, that is, within a wellbore. Various properties of hydrocarbon reservoir fluids, such as viscosity, bubble point pressure, density and phase behavior of the fluid at reservoir conditions, may be used to evaluate potential reserves, determine flow in porous media and design completion, separation, treating, and metering systems, among others.

Additionally, samples of the fluid(s) may be collected in the downhole tool and retrieved at the surface. The downhole tool stores the formation fluid(s) in one or more sample chambers or bottles, and retrieves the bottles to the surface while, for example, keeping the formation fluid pressurized. These fluids may then be sent to an appropriate laboratory for further analysis, for example. Typical fluid analysis or characterization may include, for example, composition analysis, fluid properties and phase behavior, and/or bubble point pressure. Additionally or alternatively, such analysis may be made at the wellsite using a transportable lab system.

SUMMARY

Example methods and apparatus to measure fluid flow rates are disclosed. A disclosed example apparatus includes a flowline, a circulator to selectively circulate a fluid in the flowline, a generator controllable to form a heat wave in the fluid, wherein the generator is thermally coupled to the flowline at a first location, a sensor to measure a first value representative of the heat wave, wherein the sensor is thermally coupled to the flowline at a second location, a phase detector to determine a second value representative of a wavelength of the heat wave at the second location based on the first value, a frequency adjuster to control the generator to form the heat wave in the fluid at a first frequency, the first frequency selected so that the second value is substantially equal to a distance between the first and second locations, and a flow rate determiner to determine a flow rate of the fluid based on the first frequency.

A disclosed example method to measure a flow rate of a fluid includes forming a first heat wave having a first frequency in the fluid at a first location, the first heat wave formed while the fluid is not circulating, selecting the first frequency based on a first wavelength of the first heat wave detected at a second location and a distance between the first and second locations, forming a second heat wave having a second frequency in the fluid at the first location, the second heat wave formed while the fluid is circulating, selecting the second frequency based on a second wavelength of the second heat wave detected at the second location and the distance between the first and second locations, and determining the flow rate of the circulated fluid based on the first and second frequencies.

Certain examples are shown in the above-identified figures and described in detail below. In describing these examples, like or identical reference numbers may be used to identify common or similar elements. The figures are not necessarily to scale and certain features and certain views of the figures may be shown exaggerated in scale or in schematic for clarity and/or conciseness. Moreover, while certain preferred embodiments are disclosed herein, other embodiments may be utilized and structural changes may be made without departing from the scope of the invention.

DETAILED DESCRIPTION

The example methods and apparatus disclosed herein provide certain advantages for laboratory, downhole and/or wellbore applications that include, but are not limited to, an ability to more accurately determine the flow rate of a fluid. Traditionally, the flow rate of a fluid is estimated based on a presumed operating speed of a fluid circulation pump. However, the actual operating speed of the pump may be difficult or impractical to determine, and may be different from the intended operating speed due to manufacturing tolerances. Additionally, the viscosity of the fluid being tested also affects the actual flow rate of the fluid for a given pump operating speed. To overcome these difficulties, the examples described herein measure the heat propagation characteristics of the fluid while uncirculated, measure the heat propagation characteristics of the fluid while the fluid is circulating, and use these measured characteristics to determine the actual flow rate of the fluid while circulating.

Figure 1:
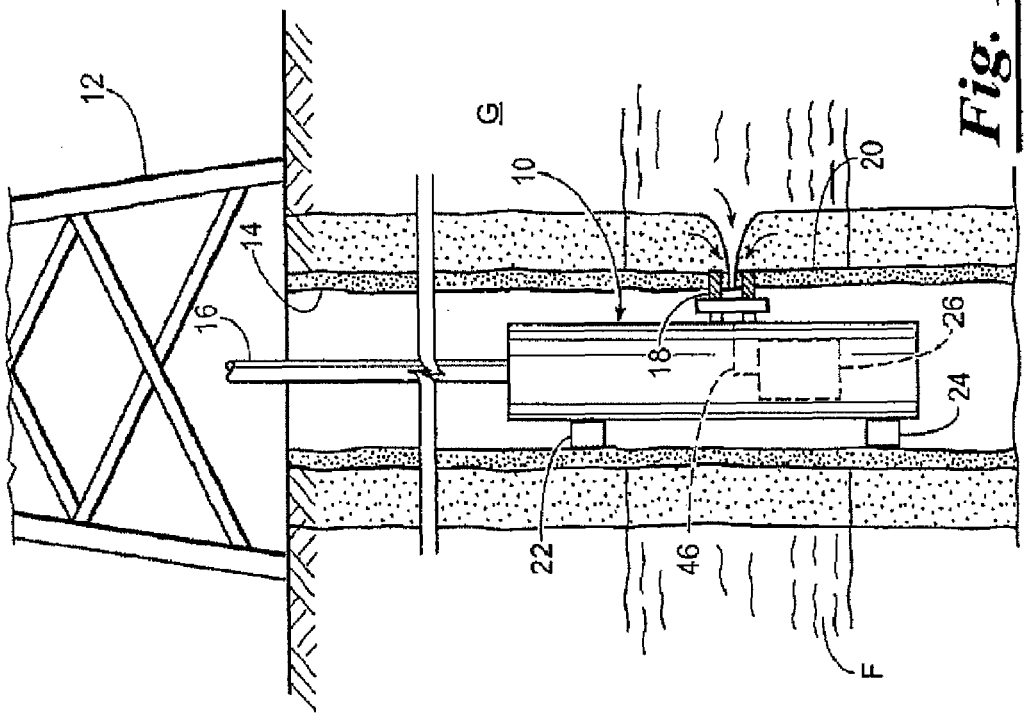
FIG. 1 is a schematic, partial cross-sectional view of a downhole wireline tool suspended from a rig and having an internal flow rate measuring assembly.

FIG. 1 shows a schematic, partial cross-sectional view of an example downhole tool 10. The example downhole tool 10 of FIG. 1 is suspended from a rig 12 in a wellbore 14 formed in a geologic formation G. The example downhole tool 10 can implement any type of downhole tool capable of performing formation evaluation, such as x-ray fluorescence, fluid analysis, fluid sampling, well logging, etc. The example downhole tool 10 of FIG. 1 is a wireline tool deployed from the rig 12 into the wellbore 14 via a wireline cable 16 and positioned adjacent to a particular geologic formation F.

To seal the example downhole tool 10 of FIG. 1 to a wall 20 of the wellbore 14 (hereinafter referred to as a "wall 20" or "wellbore wall 20"), the example downhole tool 10 includes a probe 18. The example probe 18 of FIG. 1 forms a seal against the wall 20 and draws fluid(s) from the formation F into the downhole tool 10 as depicted by the arrows. Backup pistons 22 and 24 assist in pushing the example probe 18 of the downhole tool 10 against the wellbore wall 20.

To perform fluid flow rate measurements, the example downhole tool 10 of FIG. 1 includes a flow rate measuring assembly 26 constructed in accordance with this disclosure. The example flow rate measuring assembly 26 of FIG. 1 receives formation fluid(s) from the probe 18 via an evaluation flowline 46. Example manners of implementing the example flow rate measuring assembly 26 are described below in connection with FIGS. 3 and 5.

Figure 2:
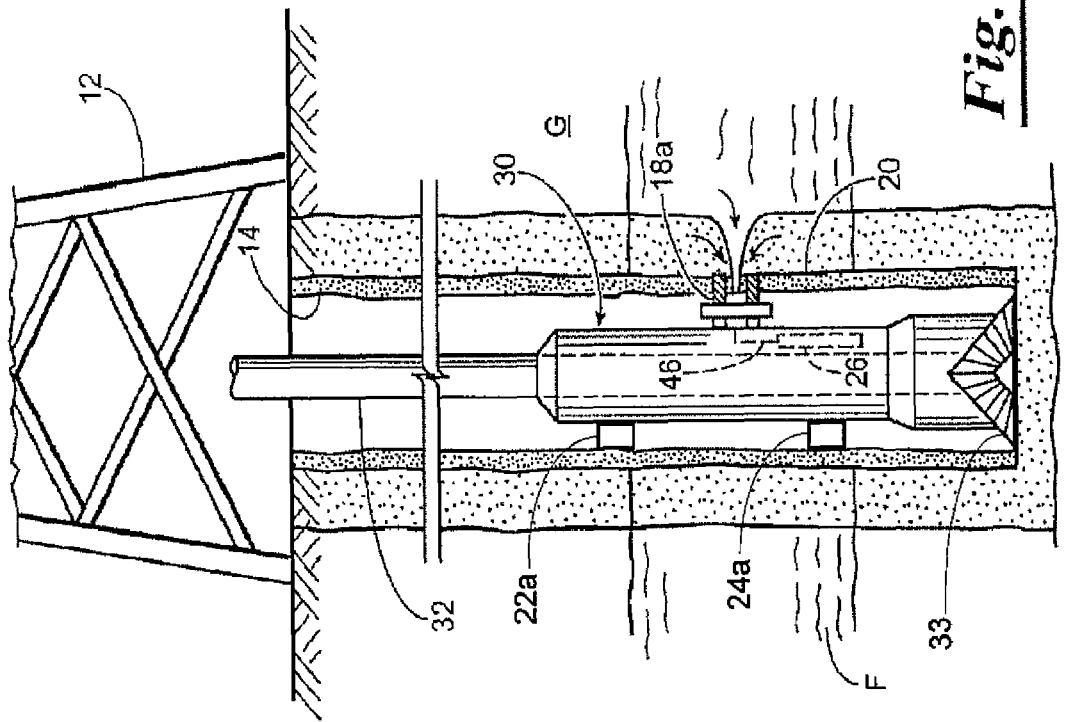
FIG. 2 is a schematic, partial cross-sectional view of a downhole drilling tool suspended from a rig and having an internal flow rate measuring assembly.

FIG. 2 shows a schematic, partial cross-sectional view of another example of a downhole tool 30. The example downhole tool 30 of FIG. 2 can be conveyed among one or more (or itself may be) of a measurement-while-drilling (MWD) tool, a logging-while-drilling (LWD) tool, or other type of downhole tool that are known to those skilled in the art. The example downhole tool 30 is attached to a drill string 32 and a drill bit 33 driven by the rig 12 and/or a mud motor (not shown) driven by mud flow to form the wellbore 14 in the geologic formation G.

To seal the example downhole tool 30 of FIG. 2 to the wall 20 of the wellbore 14, the downhole tool 30 includes a probe 18a. The example probe 18a of FIG. 2 forms a seal against the wall 20 to draw fluid(s) from the formation F into the downhole tool 30 as depicted by the arrows. Backup pistons 22a and 24a assist in pushing the example probe 18a of the downhole tool 30 against the wellbore wall 20. Drilling is stopped before the probe 18a is brought in contact with the wall 20.

To perform fluid flow rate measurements, the example downhole tool 30 of FIG. 2 includes the example flow rate measuring assembly 26. The example flow rate measuring assembly 26 of FIG. 2 receives formation fluid(s) from the probe 18a via the evaluation flowline 46. Example manners of implementing the example flow rate measuring assembly 26 are described below in connection with FIGS. 3 and 5.

While FIGS. 1 and 2 depict the flow rate measuring assembly 26 in the example downhole tools 10 and 30, respectively, the flow rate measuring assembly 26 may instead be provided or implemented at the wellsite (e.g., at the surface near the wellbore 14), and/or at an offsite facility for performing fluid tests. By positioning the flow rate measuring assembly 26 in the downhole tool 10, 30, real-time data may be collected concerning fluid flow rate and, thus, for example, the bubble point pressure of downhole fluids. However, it may also be desirable and/or necessary to test fluids at the surface and/or offsite locations. In such cases, the example flow rate measuring assembly 26 may be positioned in a housing transportable to a desired location. Alternatively, fluid samples may be taken to a surface or offsite location and tested in the flow rate measuring assembly 26 at such a location. Data and test results from various locations may be analyzed and compared.

Figure 3:
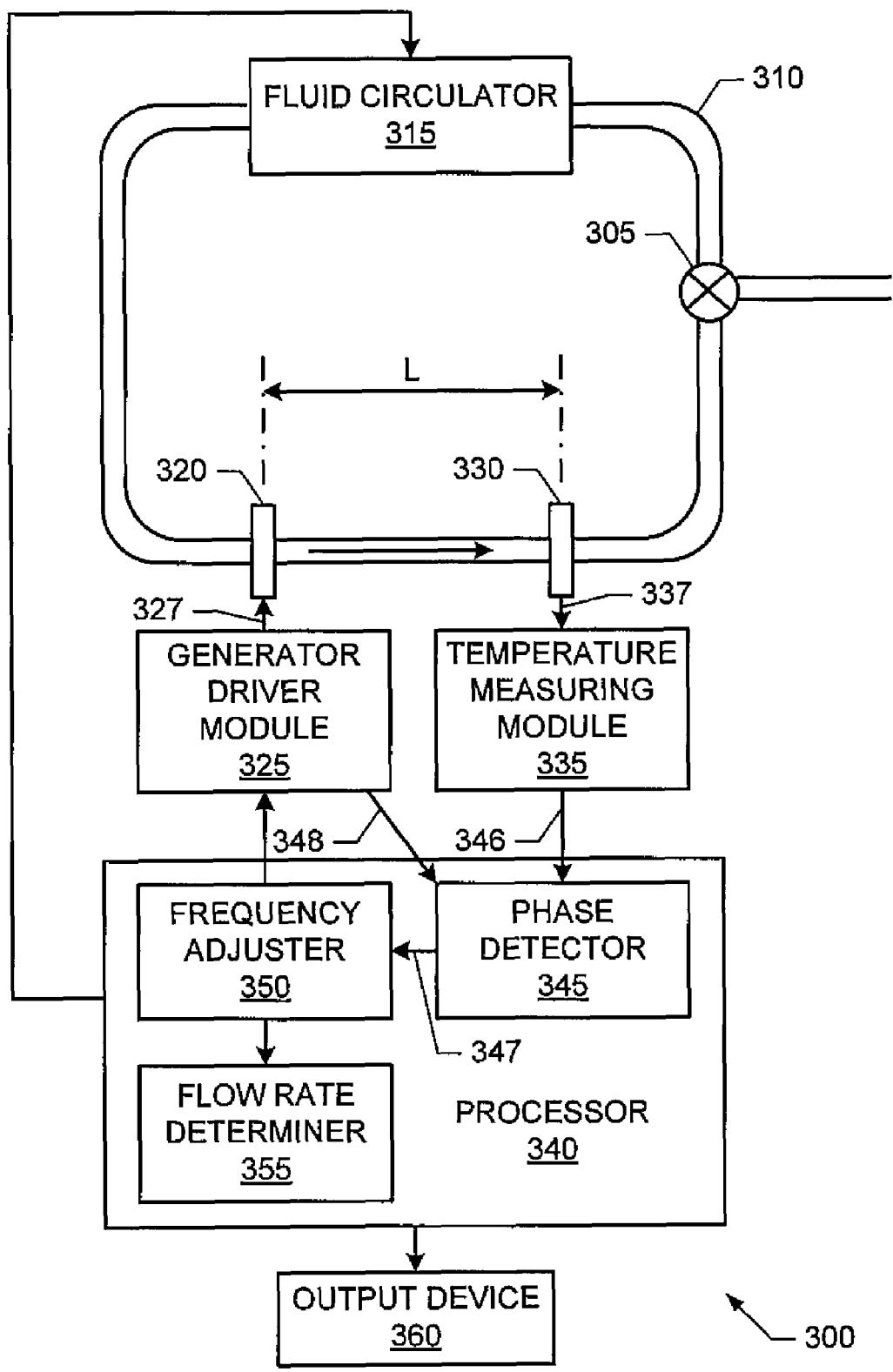
FIG. 3 is a schematic diagram of an example flow rate measuring assembly.

FIG. 3 is a schematic diagram of an example flow rate measurement assembly 300. The example flow rate measurement assembly 300 of FIG. 3 may be used to implement the example flow rate measurement assemblies 26 of FIGS. 1, 2 and 5, and/or may be used to perform fluid flow rate measurements at the surface, at a wellsite, in a transportable lab, and/or in a fixed-location facility.

To capture a fluid, the example flow rate measurement assembly 300 of FIG. 3 includes one or more valves, one of which is designated at reference numeral 305, and a flowline 310. The example flowline 310 of FIG. 3 is any flowline suitable for holding, containing and/or otherwise allowing a fluid to be circulated. The example valve 305 of FIG. 3 is any type of valve that is operable and/or controllable to allow fluid(s) to enter and/or exit the flowline 310. In some examples, one valve 305 is used to allow fluid(s) to enter the flowline 310, and another valve (not shown) is used to allow fluid(s) to exit the flowline 310.

To circulate the fluid trapped, captured and/or otherwise contained in the example flowline 310, the example flow rate measurement assembly 300 of FIG. 3 includes a circulator 315. The example circulator 315 of FIG. 3 is any device, such as a pump, capable to circulate the fluid captured in the flowline 310. In the illustrated example of FIG. 3, the circulator 315 circulates the captured fluid in a counter-clockwise direction within the flowline 310.

To form, introduce and/or otherwise create a heat wave in the fluid captured in the flowline 310, the example flow rate measurement assembly 300 of FIG. 3 includes a generator 320 and a generator driver module 325. The example generator 320 of FIG. 3 is an annular shaped Peltier heating/cooling element that is located adjacent to and/or around (e.g., surrounding partially or fully) the flow line 310 at a first location. An inner surface of the example generator 320 is in thermal contact with the flowline 310, and an outer surface of the generator 320 is in thermal contact with any large heat mass (not shown) to drain heat generated by the Joule effect from the generator 320.

The example generator driver module 325 of FIG. 3 provides a drive current signal 327 for the example generator 320. By changing the polarity of the drive current 327, the example generator driver module 325 can control whether the generator 320 is heating or cooling the captured fluid. By adjusting and/or controlling the drive current 327 along, for example, a sinusoidal-shaped curve, the generator driver module 325 controls the generator 320 to form an oscillating heat wave in the fluid captured in the flow line 310 without changing the average temperature of the captured fluid. The rate at which the drive current 327 is cycled determines the frequency (f) at which a heat wave is generated in the captured fluid.

To measure and/or otherwise detect propagation of the heat wave, the example flow rate measurement assembly 300 of FIG. 3 includes a sensor 330 and a temperature measuring module 335. The example sensor 330 of FIG. 3 is positioned at a second location of the flowline 310 that is a distance L from the location of the generator 320. The example sensor 330 may be any type of sensor capable to measure the temperature of the fluid captured in the flowline 310. Example sensors 330 include, but are not limited to, a thermometer, a thermocouple, a thermistor and/or a thin-metal sensor. The type of sensor 330 selected and/or implemented may depend on the type of environment(s) in which the flow rate measurement assembly 300 is to operate. For example, for a downhole application, a thermocouple 330 that can operate in the presence of a high pressure and/or high temperature may be selected.

The example temperature measuring module 335 of FIG. 3 converts an analog signal 337 received from the sensor 330 into one or more digital samples 346 suitable for processing by a processor 340. The digital samples 346 represent the current and/or instantaneous temperature and/or phase of the heat wave at the sensor 330. The example temperature measuring module 335 may include any number and/or type(s) of amplifier(s), filter(s) and/or analog-to-digital converter(s). The example processor 340 of FIG. 3 may be any type of processing unit, such as a processor core, a processor and/or a microcontroller capable to, among other things, execute machine readable instructions stored on a tangible medium. The example processor 340 may be part of a processing platform, such as the example processing platform P100 described below in connection with FIG. 7.

The speed at which the heat wave generated by the generator 320 propagates in the fluid captured in the flowline 310 depends on the heat propagation speed $v_o$ of the captured fluid and the speed or fluid flow rate and/or velocity v at which the fluid is flowing and/or circulating. As described below, the example processor 340 of FIG. 3 determines a first or base heat wave generation frequency $f_o$ that results in a heat wave having a wavelength λ that is substantially equal to the distance L between the generator 320 and the sensor 330. This first or base frequency $f_o$ is determined while the fluid is not circulating or flowing in the flowline 310. When the fluid is circulating, the wavelength λ of the heat wave in the fluid will change. As described below, by determining a second heat wave generation frequency f while the fluid is circulating that also results in the heat wave having a wavelength λ that is substantially equal to the distance L, the fluid flow rate v of the fluid can be computed, estimated and/or otherwise determined.

To measure the wavelength λ of the heat wave between the generator 320 and the sensor 330, the example processor 340 of FIG. 3 includes a phase detector 345. The example phase detector 345 of FIG. 3 measures, computes and/or otherwise determines a difference 347 between a first phase 348 of the heat wave at the generator 320 and a second phase 346 of the heat wave at the sensor 330. Such a phase difference 347 is representative of whether the wavelength λ of the heat wave is different from the distance L. As shown in FIG. 3, the example generator driver module 325 provides to the example phase detector 345 values representative of the current and/or instantaneous phase and/or temperature of the heat wave at the generator 320.

To improve the accuracy of the example flow rate measuring assembly 300, the lag between the drive current signal generated by the generator drive module 325 and the introduction of a corresponding temperature in the captured fluid at the generator 320 should be reduced and/or minimized. The lag may be reduced by, for example, using a generator 320 having a low heat mass. Additionally or alternatively, a calibration procedure may be used to determine, measure and/or estimate the lag and to compensate for the same, and/or a second sensor (not shown) located near the generator 320 could be used as a phase reference signal.

Likewise, the lag between the current and/or instantaneous phase and/or temperature of the captured fluid at the sensor 330 and the digital samples 346 should be reduced and/or minimized. This lag may be reduced by, for example, selecting a sensor 330 having a shorter lag. For example, a thin-metal sensor has a short lag. Additionally or alternatively, the lag of the sensor 330 and the temperature measuring module 335 can be compensated. Example methods to perform lag compensation are described in Tagawa et al., "A Two-Thermocouple Probe Technique for Estimating Thermocouple Time Constants In Flow With Combustion: In Situ Parameter Identification Of a First-Order Lag System," published in Review of Scientific Instruments, Vol. 69, No. 9, September 1998, pages 3370-3378, and which is hereby incorporated by reference in its entirety.

Figure 4A:
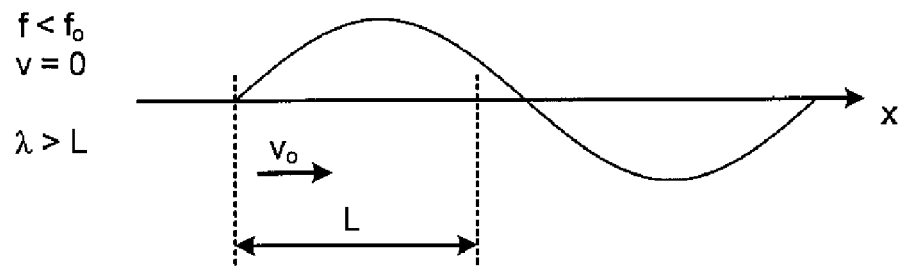
FIGS. 4A-4D are graphs illustrating example operations of the example flow rate measuring assemblies of FIGS. 1-3 and 5.

FIG. 4A illustrates an example where the fluid captured in the flowline 310 is not circulating, and the heat wave generation frequency f is less than the base frequency $f_o$. Accordingly, the wavelength λ of the heat wave is greater than the distance L and the corresponding phase difference 347 would not be substantially zero.

Figure 4B:
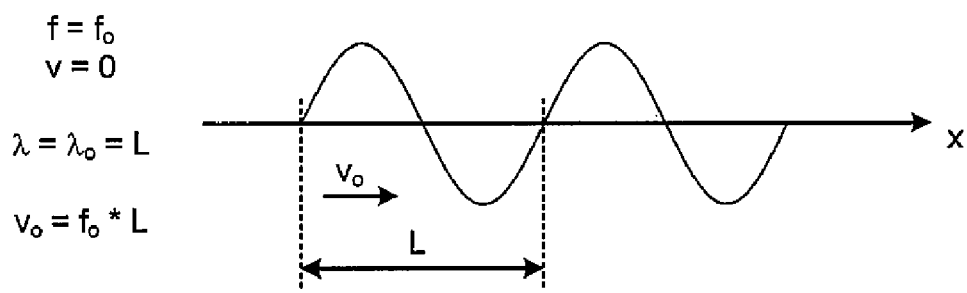

To control the heat wave generation frequency f based on the phase difference 347 computed by the phase detector 345, the example processor 340 of FIG. 3 includes a frequency adjuster 350. The example frequency adjuster 350 of FIG. 3 controls the frequency of the drive current signal 327 created by the generator driver module 325 to drive the computed phase difference 347 to substantially zero. When the phase difference 347 is substantially zero, the wavelength λ of the heat wave is substantially equal to the distance L, as shown in FIG. 4B. As described above, the base frequency $f_o$ is the heat wave generation frequency corresponding to a heat wave wavelength λ substantially equal to L for a non-circulating captured fluid. Thus, by controlling, adjusting and/or selecting the heat wave generation frequency f to minimize the phase difference 347 computed by the phase detector 345, the example frequency adjuster 350 can determine and/or identify the base frequency $f_o$. To avoid issues related to harmonics, the example frequency adjuster 350 of FIG. 3 starts with a heat wave generation frequency f of zero and increases the frequency f until the wavelength λ is as close as possible to L. If desired, the heat propagation speed $v_o$ of the captured fluid can be computed as $v_o = f_o * L$.

Because of, for example, noise and/or quantization effects, it may be impractical and/or impossible to drive and/or maintain the phase difference 347 at exactly zero. Thus, the frequency adjuster 350, within practical limits, controls the generator drive module 325 to maintain the wavelength λ as close to L as possible.

Figure 4C:
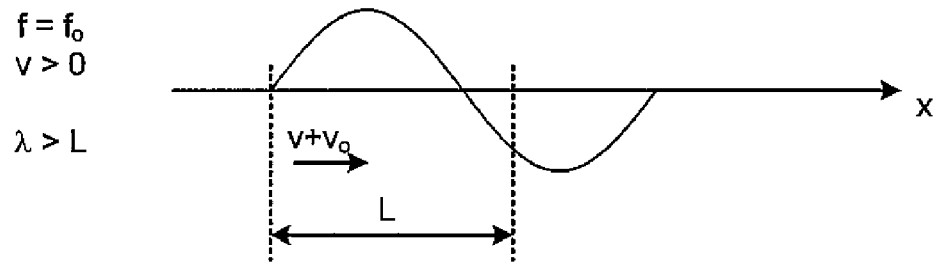
Figure 4D:
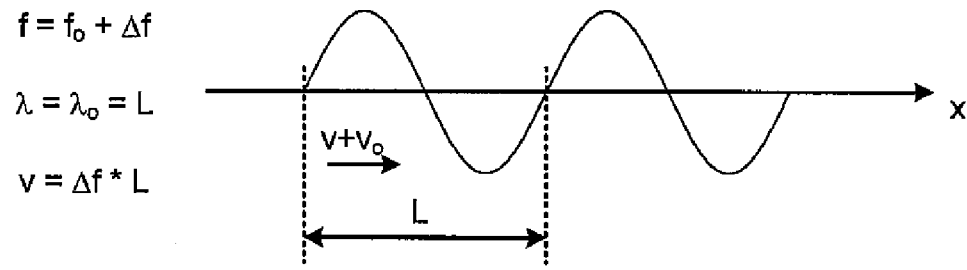

When circulation of the captured fluid is started (v>0), the wavelength λ of the heat wave will change. As shown in FIG. 4C, circulation of the captured fluid will increase the wavelength λ of the heat wave. Accordingly, the example frequency adjuster 350 of FIG. 3 increases the heat wave generation frequency f until the wavelength λ is again substantially equal to L, as shown in FIG. 4D. As shown in FIG. 4D, an increase in frequency of Δf was required for the wavelength λ to again be substantially equal to L.

In some examples, the example phase detector 345 and the example frequency adjuster 350 are implemented using phase-locked loop synthesizer and/or module.

To compute the flow rate v of the fluid captured in the flowline 310, the example processor 340 of FIG. 3 includes a flow rate determiner 355. The example flow rate determiner 355 of FIG. 3 computes the flow rate v of the captured fluid based on the frequencies f and $f_o$. In particular, the flow rate v of the captured fluid can be computed by multiplying the distance L, and the increase Δf in heat wave generation frequency that was required so that that the wavelength λ again is substantially equal to L after the fluid began circulating. Mathematically, this can be expressed as:

$$v = \Delta f * L, \qquad \text{EQN (1)}$$

where $$\Delta f = f - f_o. \quad \text{EQN (2)}$$

To output, store, display and/or otherwise present a fluid flow rate value v and/or a heat propagation speed $v_o$ determined by the flow rate determiner 355, the example flow rate measurement assembly 300 of FIG. 3 includes any number and/or type(s) of output devices, one of which is designated at reference numeral 360. In an example, the processor 340 computes a plurality of fluid flow rate values v and/or a plurality of heat propagation speeds $v_o$ for a captured fluid over a period of time, and/or for a plurality of captured fluids. In another example, one or more fluid flow rate values and/or heat propagation speed values are rendered at the output device 360 (e.g., printed, displayed, etc.). In yet another example, fluid flow rates values and/or heat propagation speed values are stored in a memory, a memory device and/or any other type of storage 340. While in the illustrated example of FIG. 2, the processor 340 and the output device 360 are depicted separately; the processor 340 may include and/or implement the output device 360, and/or the processor 340 and the output device 360 may be separate devices. For example, a memory 360 may be implemented by and/or within the processor 340. Moreover, the processor 340 and the output device 360 may be collectively implemented by a processor platform, such as the example processor platform P100 of FIG. 7.

While an example manner of implementing a flow rate measurement assembly 300 has been illustrated in FIG. 3, one or more of the elements, sensors, circuits, modules, processes and/or devices illustrated in FIG. 3 may be combined, divided, re-arranged, omitted, eliminated, implemented in a recursive way, and/or implemented in any other way. Further, the example valve 305, the example flowline 310, the example circulator 315, the example generator 320, the example generator driver module 325, the example sensor 330, the example temperature measuring module 335, the example processor 340, the example phase detector 345, the example frequency adjuster 350, the example flow rate determiner 355, the example output device 360 and/or, more generally, the example flow rate measurement assembly 300 of FIG. 3 may be implemented by hardware, software, firmware and/or any combination of hardware, software and/or firmware. Thus, for example, any or all of the example valve 305, the example flowline 310, the example circulator 315, the example generator 320, the example generator driver module 325, the example sensor 330, the example temperature measuring module 335, the example processor 340, the example phase detector 345, the example frequency adjuster 350, the example flow rate determiner 355, the example output device 360 and/or, more generally, the example flow rate measurement assembly 300 may be implemented by one or more circuit(s), programmable processor(s), application specific integrated circuit(s) (ASIC(s)), programmable logic device(s) (PLD(s)), field-programmable logic device(s) (FPLD(s)), field-programmable gate array(s) (FPGA(s)), etc. Further still, the flow rate measuring assembly 300 may include elements, sensors, circuits, modules, processes and/or devices instead of, or in addition to, those illustrated in FIG. 3 and/or may include more than one of any or all of the illustrated elements, sensors, circuits, modules, processes and/or devices.

Figure 5:
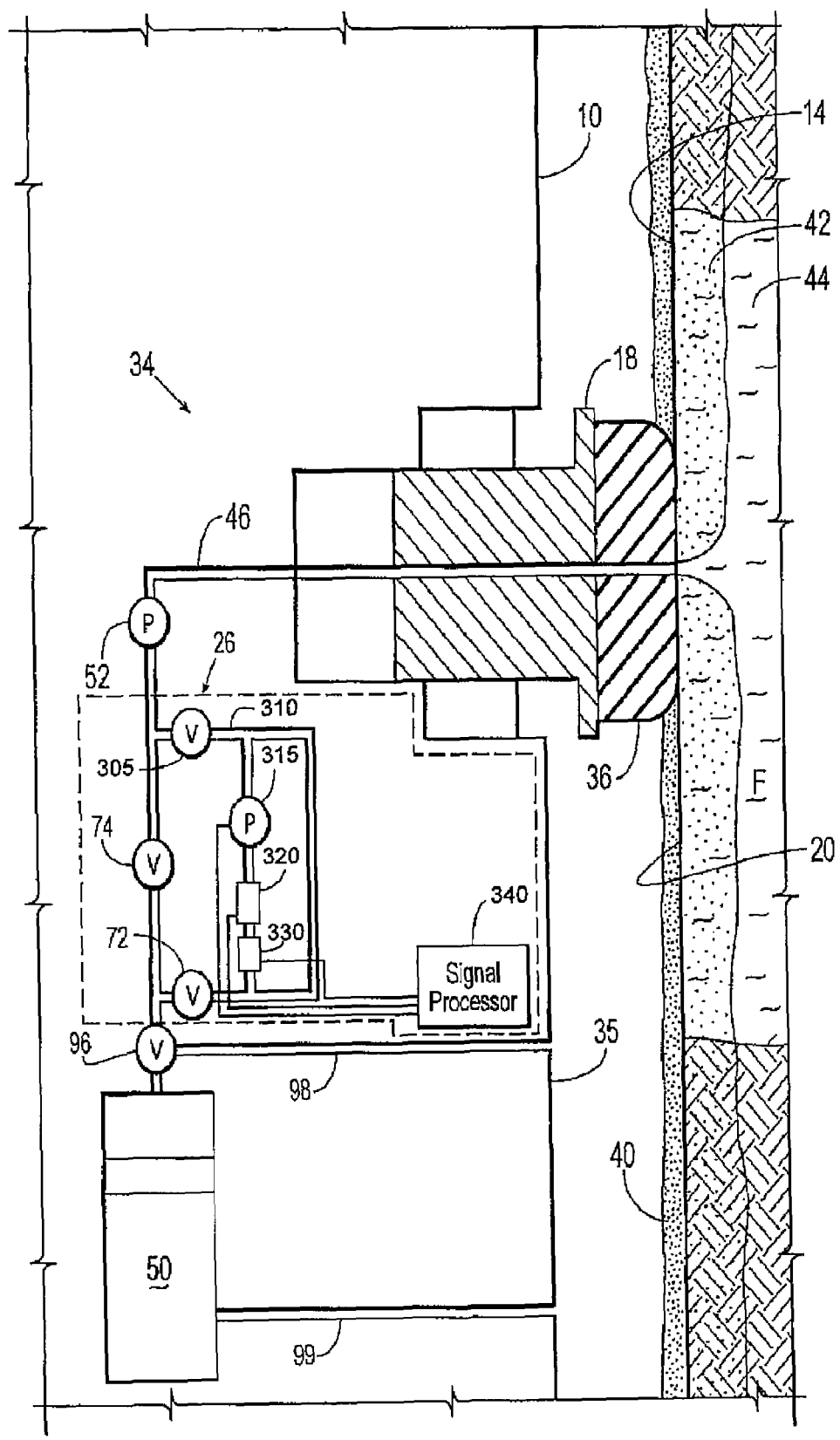
FIG. 5 illustrates an example manner of implementing any of the example flow rate measuring assemblies of FIGS. 1-3.

FIG. 5 illustrates an example manner of implementing the example flow rate measuring assemblies 26 and 300 of FIGS. 1-3 and/or, more generally, a fluid analysis system 34 for either or both of the example downhole tools 10 and 30 of FIGS. 1 and 2. For ease of discussion, the example fluid analysis system 34 of FIG. 5 is described with reference to the example downhole tool 10 of FIG. 1. However, the example fluid analysis system 34 may, additionally or alternatively, be used to implement a fluid analysis system 34 for the example downhole tool 30 of FIG. 2.

The example probe 18 of FIG. 5 extends from a housing 35 of the downhole tool 10 for engagement with the wellbore wall 20. The probe 18 is provided with a packer 36 for sealing with the wellbore wall 20. The packer 36 contacts the wellbore wall 20 and forms a seal with a mud cake 40 lining the wellbore 14. The mud cake 40 gets deposited on the wellbore wall 20 due to seepage of mud and mud filtrate into the formation F. This seepage creates an invaded zone 42 about the wellbore 14. The invaded zone 42 contains mud filtrate and other wellbore fluids that contaminate the surrounding formations, including the formation F and a portion of the virgin fluid 44 contained therein.

The example fluid analysis system 34 of FIG. 5 includes the evaluation flowline 46 extending from an inlet in the probe 18. While the probe 18 is depicted for drawing fluid into the downhole tool, other fluid communication devices may be used. Examples of fluid communication devices, such as probes and dual packers, used for drawing fluid into a flowline are depicted in U.S. Pat. Nos. 4,860,581 and 4,936,139. U.S. Pat. Nos. 4,860,581 and 4,936,139 are hereby incorporated by reference in their entireties.

The example evaluation flowline 46 of FIG. 5 extends into the downhole tool 10 and is used to pass fluid(s), such as the virgin fluid 44 into the downhole tool 10 for pre-test, analysis and/or sampling. The example evaluation flowline 46 extends to a sample chamber 50 for collecting samples of the virgin fluid(s) 44. The example fluid analysis system 34 of FIG. 5 may also include a pump 52 to draw fluid through the flowline 46.

While FIG. 5 shows an example configuration of a downhole tool 10 used to draw fluid from the formation F, it will be appreciated by one of skill in the art that any number and/or type(s) of configurations of flowlines, pumps, sample chambers, valves and other devices may be used and is not intended to limit the scope of the invention.

As discussed above, the example downhole tool 10 of FIG. 5 includes the example flow rate measuring assembly 26 to measure fluid flow rates. The example flow rate measuring assembly 26 of FIG. 5 includes, among other things, the example valve 305, the example fluid evaluation flowline 310, the example fluid circulation device 315, the example generator 320, the example sensor 330 and the example processor 340, which were described above in connection with FIG. 3. For clarity of illustration, the example generator driver module 325 and the example temperature measuring module 335 of FIG. 3 are not shown in FIG. 5.

The example flowline 310 of FIG. 5 is implemented as a bypass flowline communicating with the evaluation flowline 46 such that formation fluid(s) can be positioned or diverted into the bypass flowline 310. In general, the example fluid evaluation flowline 310 includes all flowlines fluidly coupled to the flowline 310 and positioned to the right of valves 305 and 72. As used herein, the term "fluid captured in the flowline 310" refers to collectively to fluid contained and/or captured in any of these devices.

The example flow rate measuring assembly 26 of FIG. 5 includes the valve 305, a second valve 72, and a third valve 74 for selectively diverting the formation fluid into and out of the flowline 310, as well as isolating the flowline 310 from the evaluation flowline 46.

To divert the formation fluid F into the flowline 310, the first valve 305, and the second valve 72 are opened, while the third valve 74 is closed. This diverts the formation fluid into the flowline 310 while the pump 52 is moving the formation fluid. Then, the first valve 305 and the second valve 72 are closed to isolate, trap and/or capture the formation fluid within the flowline 310. If desired, the third valve 74 can be opened to permit normal or a different operation of the downhole tool 10. For example, the valve 74 may be opened, and the valves 305 and 72 closed while the fluid in the flowline 310 is being evaluated. Additional valves and flowlines or chambers may be added as desired to facilitate the flow of fluid(s).

The example circulator and/or fluid movement device 315 of FIG. 5 is to move and/or mix the fluid within the flowline 310 to enhance the homogeneity and circulation of the fluid. Fluid is preferably moved through flowline 310 to enhance the accuracy of the measurements obtained by the generator 320 and the sensor 330. In general, the fluid movement device 315 has a medium to apply force to the formation fluid to cause the formation fluid to be circulated within the flowline 310.

The example circulator 315 of FIG. 5 can be any type of device capable of applying force to the formation fluid to cause the formation fluid to be circulated and optionally mixed within the flowline 310. For example, the circulator 315 can be a positive displacement pump, such as a gear pump, a rotary lobe pump, a screw pump, a vane pump, a peristaltic pump, or a piston and progressive cavity pump.

The example flow rate measuring assembly 26 of FIG. 5 is also provided with the example processor 340 communicating with the example circulator 315, the example generator 320 and/or the example sensor 330. As described above in connection with FIG. 3 and below in connection with FIG. 6, the example processor 340 controls the example generator 320 and receives inputs from the example sensor 330 to measure, compute, estimate and/or otherwise determine the flow rate of a fluid as it circulates in the flowline 310.

The example signal processor 340 of FIG. 5 can communicate with the pump 305, the generator 320 and the sensor 330 via any suitable communication link, such as a cable or wire communication link, an airway communication link, infrared communication link, microwave communication link, or the like. Although the example signal processor 340 is illustrated as being within the housing 35 of the downhole tool 10, it should be understood by that the signal processor 340 could be provided remotely with respect to the downhole tool 10. For example, the signal processor 340 can be provided at a monitoring station located at the wellsite, or located remotely from the wellsite. The signal processor 340 includes one or more electronic or optical device(s) capable of executing the logic to affect the control of the example pump 305, the example generator 320 and/or the example sensor 330, as well as to collect, store or manipulate information from the sensor 330 and/or to compute fluid flow rate as described herein. The signal processor 340 can also communicate with and control the first valve 305, the second valve 72, and the third valve 74 to selectively divert fluid into and out of the flowline 310 as discussed above. For purposes of clarity, lines showing the communication between the signal processor 340 and the first valve 305, the second valve 72 and the third valve 74 have been omitted from FIG. 5.

The example downhole tool 10 of FIG. 5 also includes a fourth valve 96 for selectively diverting the formation fluid into the sample chamber 50, or to the wellbore 14 via a flowline 98. The downhole tool 10 may also be provided with an exit port 99 extending from a backside of sample chamber 50. A fluid sample can be captured in the sample chamber 50 and retrieved to the example flow rate measurement assembly 300 of FIG. 3 to measure fluid flow rates. Such analysis may be performed at the wellsite, in a transportable lab and/or at a fixed-location lab.

Figure 6:
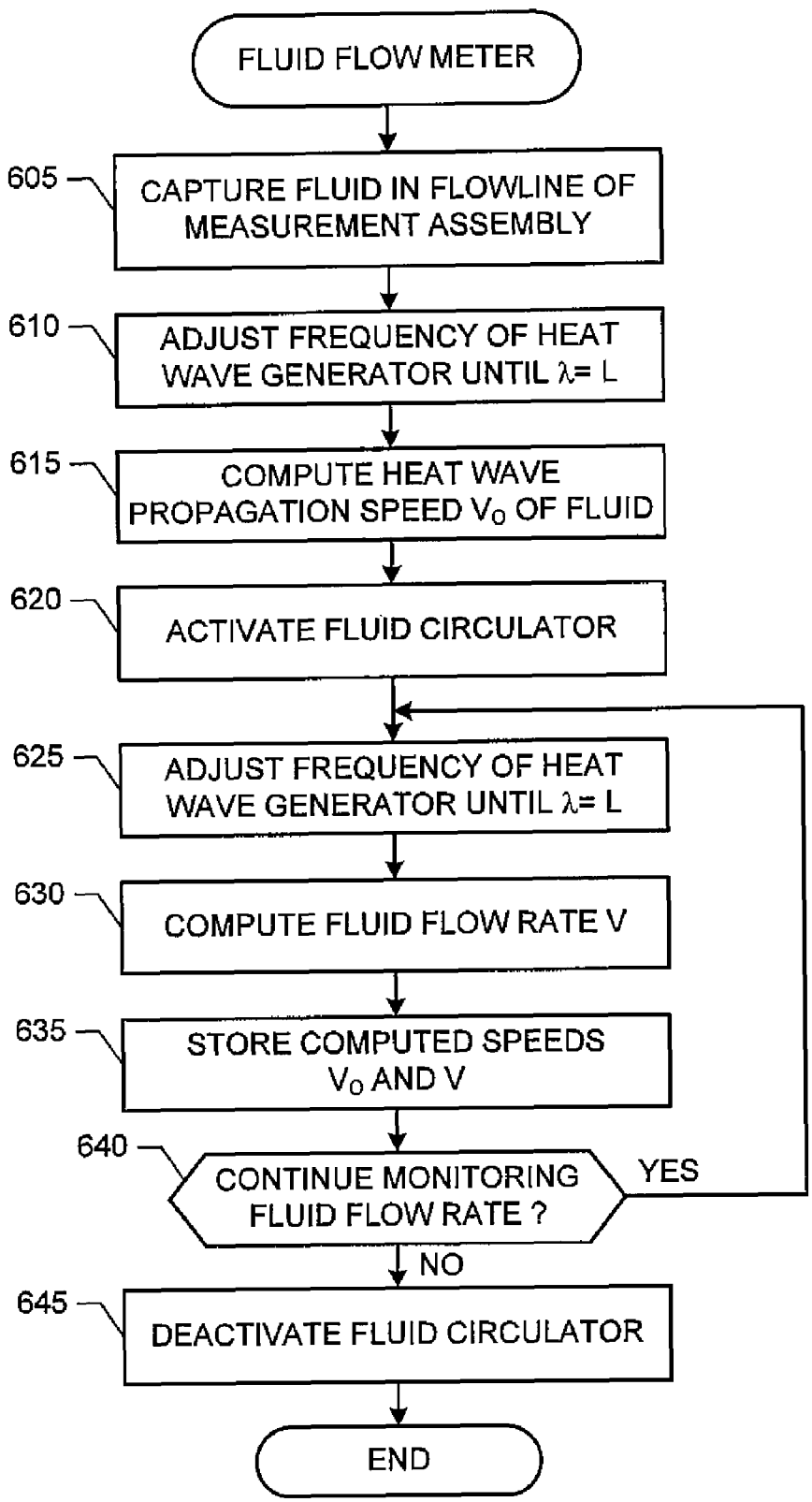
FIG. 6 illustrates an example process that may be carried out to measure fluid flow rates, and/or to implement the example flow rate measuring assemblies of FIGS. 1-3 and 5.

FIG. 6 is a flowchart representative of an example process that may be carried out to implement the example flow rate measuring assemblies 26 and 300 of FIGS. 1-3 and 5. The example process of FIG. 6 may be carried out by a processor, a controller and/or any other suitable processing device. For example, the example process of FIG. 6 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible and/or machine-readable instructions or data structures, and which can be accessed by a processor, a general-purpose or special-purpose computer, or other machine with a processor (e.g., the example processor platform P100 discussed below in connection with FIG. 7). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example process of FIG. 6 may be implemented using any combination(s) of ASIC(s), PLD(s), FPLD(s), FPGA(s), discrete logic, hardware, firmware, etc. Also, some or all of the example process of FIG. 6 may instead be implemented manually or as any combination of any of the foregoing techniques, for example, any combination of firmware, software, discrete logic and/or hardware. Further, many other methods of implementing the example operations of FIG. 6 may be employed. For example, the order of execution of the blocks may be changed, and/or one or more of the blocks described may be changed, eliminated, sub-divided, or combined. Additionally, any or all of the example process of FIG. 6 may be carried out sequentially and/or carried out in parallel by, for example, separate processing threads, processors, devices, discrete logic, circuits, etc.

The example process of FIG. 6 begins with the example processor 340 controlling the example valve 305 to capture a fluid in the example flowline 310 (block 605). The example frequency adjuster 350 adjusts the frequency $f_o$ at which the example generator 320 forms a heat wave in the captured fluid until the wavelength λ of the heat wave is substantially equal to a distance L between the generator 320 and the sensor 330 (block 610). The frequency adjuster 350 adjusts and/or selects the frequency $f_o$ based on phase difference values 347 computed by the phase detector 345. The example flow rate determiner 355 computes the heat propagation speed $v_o$ of the captured fluid (block 615).

The processor 340 activates the circulator 315 to circulate the fluid captured in the flowline 310 (block 620), and the frequency adjuster 350 adjusts the frequency f at which the example generator 320 forms a heat wave in the captured fluid until the wavelength λ of the heat wave is again substantially equal to a distance L (block 625). The example flow rate determiner 355 then computes the flow rate of the captured fluid using, for example, EQN (1) and EQN (2) (block 630).

If the flow rate measuring assembly 26 is to continue measuring and/or monitor fluid flow rate (block 640), control returns to block 625. Otherwise, the example processor 340 de-activates and/or stops the fluid circulator 315 (block 645) and control exits from the example process of FIG. 6.

Figure 7:
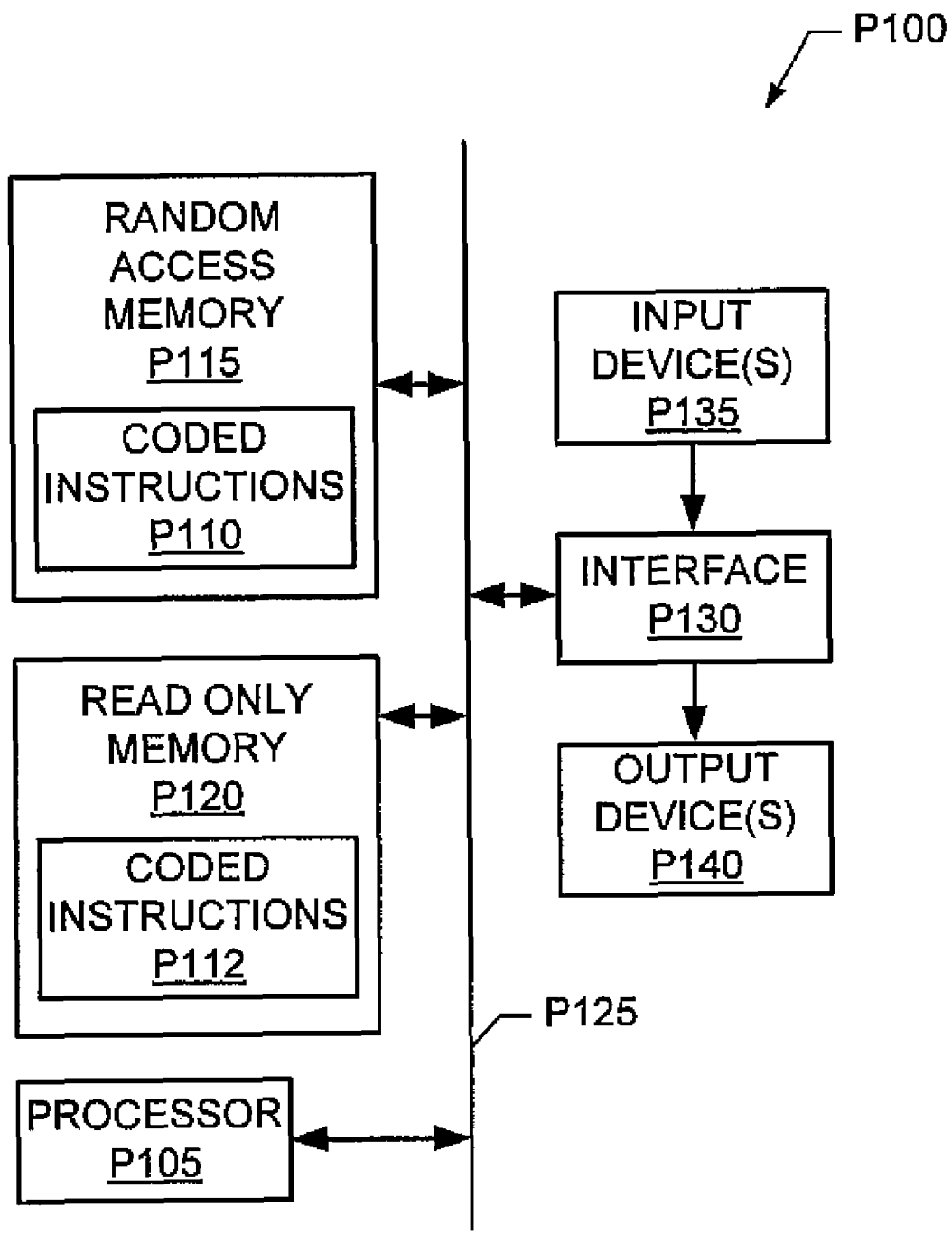
FIG. 7 is a schematic illustration of an example processor platform that may be used and/or programmed to carry out the example process of FIG. 6 and/or to implement any of all of the methods and apparatus disclosed herein.

FIG. 7 is a schematic diagram of an example processor platform P100 that may be used and/or programmed to implement the example processor 340 and/or the example flow rate measuring assemblies 26 and 300 described herein. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit such as a processor core, a processor and/or a microcontroller. The processor P105 may execute, among other things, the example process of FIG. 6 to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to implement the example output device 360.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The example output device P140 may be used to, for example, control the example pump 315, the example generator driver module 325 and/or the example generator 320. The example input device P135 may be used to, for example, collect measurements taken by the example sensor 330 and the example temperature measuring module 335.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a flowline;
   a circulator to selectively circulate a fluid in the flowline;
   a generator controllable to form a heat wave in the fluid, wherein the generator is thermally coupled to the flowline at a first location;
   a sensor to measure a first value representative of the heat wave, wherein the sensor is thermally coupled to the flowline at a second location;
   a phase detector to determine a second value representative of a wavelength of the heat wave at the second location based on the first value;
   a frequency adjuster to control the generator to form the heat wave in the fluid at a first frequency, the first frequency selected so that the second value is substantially equal to a distance between the first and second locations; and
   a flow rate determiner to determine a flow rate of the fluid based on the first frequency.

2. An apparatus as defined in claim 1, further comprising a valve to capture the fluid in the flowline.

3. An apparatus as defined in claim 1, wherein the first value is measured while the circulator is circulating the fluid in the flowline.

4. An apparatus as defined in claim 1, wherein the generator comprises a Peltier element positioned adjacent the flowline.

5. An apparatus as defined in claim 1, wherein the sensor comprises at least one of a thermometer, a thermocouple, a thermistor, or a thin metal sensor.

6. An apparatus as defined in claim 1, further comprising a phase-locked loop synthesizer to implement the phase detector and the frequency adjuster.

7. An apparatus as defined in claim 1, wherein the apparatus is operable while positioned within a wellbore.

8. An apparatus as defined in claim 1, further comprising:
   a generator driver circuit to receive an input value representative of a frequency from the frequency adjuster and to generate a drive current to control the generator responsive to the input value; and
   a temperature measuring module to convert the first value to a digital representation of the first value, wherein the first value represents a temperature of the fluid at the second location, and wherein the phase detector determines the second value based on the digital representation of the first value.

9. An apparatus as defined in claim 8, wherein the phase detector is to receive a third value representative of a second temperature of the fluid at the first location, and to compute the second value as a difference of the first and third values.

10. An apparatus as defined in claim 1, wherein the first value is measured while the circulator is circulating the fluid in the flowline, and while the fluid is not circulating in the flowline:
    the sensor is to measure a third value representative of the heat wave;
    the phase detector is to determine a fourth value representative of a second wavelength of the heat wave based on the third value;
    the frequency adjuster is to control the generator to form the heat wave in the fluid at a second frequency, the second frequency selected so that the fourth value is substantially equal to the distance between the first and second locations; and
    the flow rate determiner is to determine the flow rate of the fluid based on the first and second frequencies.

11. An apparatus as defined in claim 10, wherein the flow rate determiner is to:
    compute a difference between the first and second frequencies; and
    compute a product of the difference and the distance between the first and second locations.

12. A method comprising:
    forming a first heat wave having a first frequency in a fluid at a first location, the first heat wave formed while the fluid is not circulating;
    selecting the first frequency based on a first wavelength of the first heat wave detected at a second location and a distance between the first and second locations;
    forming a second heat wave having a second frequency in the fluid at the first location, the second heat wave formed while the fluid is circulating;

selecting the second frequency based on a second wavelength of the second heat wave detected at the second location and the distance between the first and second locations; and determining a flow rate of the circulated fluid based on the first and second frequencies.

13. A method as defined in claim 12, wherein determining the flow rate of the circulated fluid based on the first and second frequencies comprises:

computing a difference between the first and second frequencies; and computing a product of the difference and the distance between the first and second locations.

14. A method as defined in claim 12, wherein forming the first heat wave at the first location comprises operating a Peltier element positioned around the flowline at the first location.

15. A method as defined in claim 12, wherein forming the first and second heat waves is performed while the fluid is captured in a flowline within a wellbore.

16. A method as defined in claim 12, further comprising:
operating a valve to capture the fluid in a flowline; and
operating a circulator to circulate the fluid in the flowline to detect the second wavelength.

17. A method as defined in claim 12, wherein selecting the first frequency based on the first wavelength of the first heat wave detected at the second location and the distance between the first and second locations comprises:

detecting a first phase of the first heat wave at the first location;

detecting a second phase of the first heat wave at the second location;

computing a difference between the first and second phases; and selecting the first frequency based on the difference.

18. A method as defined in claim 17, wherein detecting the second phase of the first heat wave at the second location comprises measuring a temperature of the fluid at the second location.

* * * * *